(12) United States Patent
Giordani

(10) Patent No.: US 7,079,049 B2
(45) Date of Patent: Jul. 18, 2006

(54) ELEMENT FOR IDENTIFYING THE FUNCTIONS ASSOCIATED WITH COMPUTER KEYBOARD KEYS

(75) Inventor: Daniele Giordani, Brescia (IT)

(73) Assignee: Quix S.r.l., Milan (IT)

( * ) Notice: Subject to any disclaimer, the term of this patent is extended or adjusted under 35 U.S.C. 154(b) by 534 days.

(21) Appl. No.: 10/282,465

(22) Filed: Oct. 29, 2002

(65) Prior Publication Data

US 2003/0080881 A1 May 1, 2003

(30) Foreign Application Priority Data

Oct. 31, 2001 (IT) .......................... BS20010087 U

(51) Int. Cl.
*H03K 17/94* (2006.01)
*H03M 11/00* (2006.01)
(52) U.S. Cl. ...................... 341/22; 400/490; 400/493.1
(58) Field of Classification Search .................. 341/22; 400/490, 493.1
See application file for complete search history.

(56) References Cited

U.S. PATENT DOCUMENTS

| 4,012,127 | A | * | 3/1977 | Bolander ..................... 359/809 |
| 4,042,090 | A | * | 8/1977 | Hasebe et al. .............. 400/490 |
| 5,183,346 | A | * | 2/1993 | Tesar .......................... 400/490 |
| 6,331,083 | B1 | * | 12/2001 | Harris ......................... 400/493 |
| 6,419,494 | B1 | * | 7/2002 | Theismann et al. .......... 434/227 |
| 6,667,697 | B1 | * | 12/2003 | Botich .......................... 341/22 |

* cited by examiner

Primary Examiner—Timothy Edwards, Jr.
(74) Attorney, Agent, or Firm—Shoemaker and Mattare

(57) ABSTRACT

This invention concerns an element for identifying functions associated with the keys of a computer keyboard, characterized by the fact that it features an edging surround (14) in the shape of an elastic band intended to tightly surround the four side faces of a single key, and a flat top section (15) carrying an indication of a function associated with the key and intended to be at least partially superimposed on the upper face of the key to which it is fitted.

4 Claims, 1 Drawing Sheet

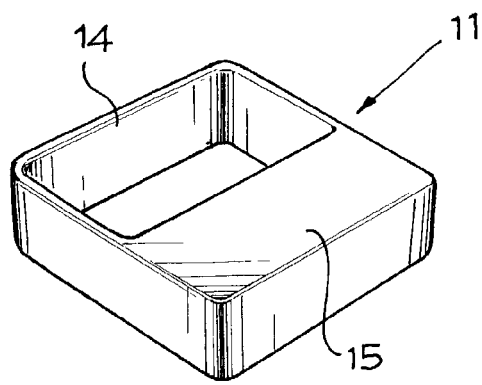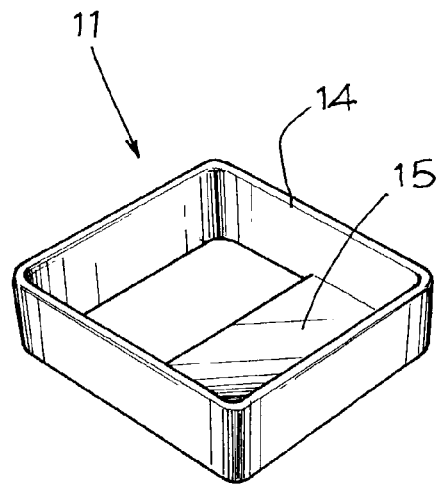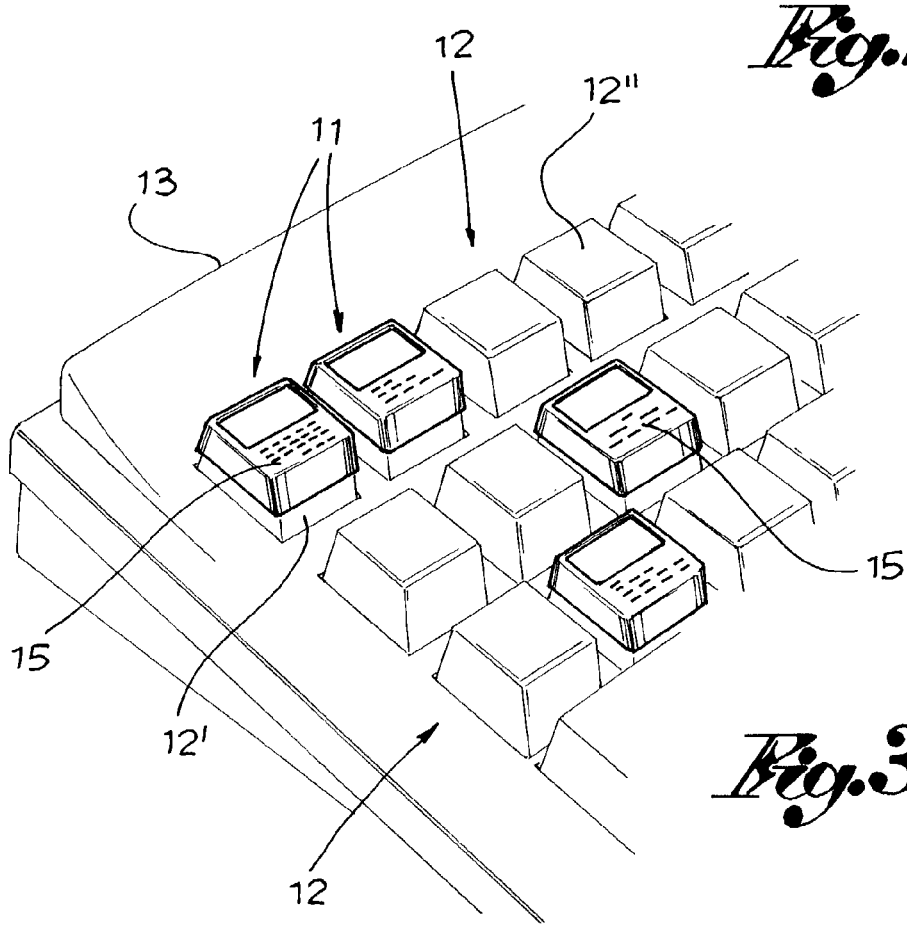

ELEMENT FOR IDENTIFYING THE FUNCTIONS ASSOCIATED WITH COMPUTER KEYBOARD KEYS

FIELD OF THE INVENTION

This invention generally concerns the computer-technology sector and refers in particular to an element for identifying the functions associated with the keys of computer keyboards, usable for making easier certain functions or operations envisaged by the program being used by the user and which can also or only be performed from the keyboard.

BACKGROUND OF THE INVENTION

It is well known that most computer programs can be controlled by the user either by means of the "mouse" or using the keyboard, by pressing the single keys to which are associated specific program management functions. The use of the keyboard for these purposes is even more necessary in the case of video-games, inasmuch as the relevant means of control, called "joystick", thanks to which many or all the game functions can be easily and intuitively performed, is not always available for each game.

Each computer program, especially each video-game, nevertheless has a specific set of functions different from the others and, in any case, the association of certain functions with single keys or combinations of keys, can vary from program to program and among the numerous video games currently available.

Consequently, it becomes rather problematic to try and memorize such function-key associations for all the various programs or video-games, with the result that wrong keys are pressed and reference often has to be made to operator's manuals with a consequent waste of time.

Some attempts have already been made to make it easier to identify the keys associated with the various program or video-game functions. For example, the use has been suggested of adhesive labels to be fitted to the single keys indicating the corresponding function, or entire masks to be superimposed on the keyboards. These labels are however hard to remove once they have been fitted to the keys and, what is more, as time passes, they become discolored and practically impossible to read, while the masks have the disadvantage of associating single keys to functions when in fact, very often, several keys can perform the same function, especially in the case of video-games, so as to provide various possible ways of using the keyboard.

SUMMARY OF THE INVENTION

The purpose of this invention is to overcome the above problems and suggest a new and successful way of identifying functions associated with keys on computer keyboards.

Another purpose of the invention is to provide an identification element that can be fitted to single keyboard keys and that is easy to fit and remove from the keys after use.

These purposes and advantages that stem from them are obtained by means of an element identifying the functions associated with the computer keyboard keys, comprising an edging surround in the form of a band which tightly surrounds the four side faces of a single key, and a flat top section showing the indication of a function associated with the key and intended to be at least partially superimposed on the upper face of the key to which it is fitted, said identification element being made of an elastic material.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 1 is a perspective view of the top of the identification element according to the present invention, identifying the functions associated with the keys of a computer keyboard;

FIG. 2 is a perspective view of the bottom of the identification element according to the present invention, identifying the functions associated with the keys of a computer keyboard, and FIG. 3 is a perspective view showing part of a computer keyboard with a number of keys fitted with the identification element according to the present invention.

DESCRIPTION OF THE PREFERRED EMBODIMENT

Referring to the drawings in particular, the number 11 indicates an element identifying the functions associated with keys 12 of computer keyboard 13. Said element substantially has the shape of a cap to be fitted on the top of the keys and consists of an edge or surround section 14 shaped like a band intended to tightly surround the four faces 12' of the keys and a flat top section 15 intended to be at least partially superimposed on the upper face 12" of the keys and bearing an indication relating to the function performed by the key with which it is associated. Preferably, the extension of said top section 15 is at most equivalent to half the upper face 12" of the keys, so as not to cover the alphanumeric character or characters printed on these.

The identification element in question is made from an elastic material to adapt to any shape of key, and consequently to keyboards made by different manufacturers, and can be square, round, oval, or other in shape. In particular, identification elements of different sines can be envisaged depending on the types of keys on the same keyboard. Moreover, the thickness of the surround section 14 is selected so that elements 11 fitted to adjacent keys 12 do not interfere with one another, causing such keys to drop together when only one of them is pressed.

Thanks to its deformability, the identification element is therefore easy to fit to the keys and can be removed after use, even though it is firmly secured to the keys once fitted. Finally, it should be noted that, besides being used as a function identifier, element 11 can also be used to customize any keyboard, inasmuch as on flat section 15 various symbols and drawings can be printed, including in different colors.

While specific embodiments of the invention have been shown and described in detail to illustrate the application of the principles of the invention, it will be understood that the invention may be embodied otherwise without departing from such principles.

The invention claimed is:

1. An element for identifying functions associated with the keys of a computer keyboard, the element comprising
    an edging surround in the shape of a band, said edging surrounding four side faces of a single key, said edging making physical contact with said four side faces of the single key and
    a top flat section carrying an indication of a function associated with the key, said top flat section being at least partially superimposed on an upper face of the key to which it is fitted, said element being made of an elastic material, wherein
said top flat section is sized so as to permit exposure of an alphanumeric character or other character associated with the key.

2. An element according to claim 1, wherein:
said element is square in shape.

3. An element according to claim 1, wherein:
said element is round in shape.

4. An element according to claim 1, wherein:
said element is polygonal in shape.

* * * * *